United States Patent [19]

Raney

[11] Patent Number: 5,581,299
[45] Date of Patent: Dec. 3, 1996

[54] MULTI-FUNCTIONAL CAMERA WITH GRAPHICS EDITOR AND FORM STAND

[76] Inventor: Robert B. Raney, 11839 Hitchcock Dr., Forest Park, Ohio 45240

[21] Appl. No.: 510,124

[22] Filed: Aug. 1, 1995

[51] Int. Cl.⁶ ........................................ H04N 5/76
[52] U.S. Cl. .................... 348/232; 348/231; 348/373; 348/552
[58] Field of Search ................ 348/64, 207, 208, 348/222, 231, 232, 373, 375, 376, 552; 354/81, 293, 75, 76, 80; H04N 5/76, 5/228

[56] References Cited

U.S. PATENT DOCUMENTS

| 4,115,813 | 9/1978 | Mikami ................................ 354/80 |
| 5,138,459 | 8/1992 | Roberts et al. . |
| 5,150,215 | 9/1992 | Shi . |
| 5,179,478 | 1/1993 | Aoki . |
| 5,191,442 | 3/1993 | Bar-Lev et al. . |
| 5,249,053 | 9/1993 | Jain . |
| 5,253,062 | 10/1993 | Ohta . |
| 5,258,843 | 11/1993 | Truong . |
| 5,293,497 | 8/1994 | Free . |
| 5,331,380 | 7/1994 | Nasset . |
| 5,387,986 | 7/1995 | Gerhart . |
| 5,389,984 | 2/1995 | Lovenheim . |

*Primary Examiner*—John K. Peng
*Assistant Examiner*—Sherrie Hsia
*Attorney, Agent, or Firm*—Richard C. Litman

[57] ABSTRACT

This is a dual film and digital camera with an internal EPROM which holds a full graphics editor and a full communications program. The communications program auto senses which external port is active and uploads itself and the graphics program and any digital images which have been taken by the camera to the remote cite.

10 Claims, 7 Drawing Sheets

MULTI-FUNCTIONAL CAMERA WITH GRAPHICS EDITOR AND FORM STAND

BACKGROUND OF THE INVENTION

1. Field of the Invention

This invention is related to the field of photography, integrated with computer, digital and video technology.

2. Description of the Prior Art

A digital camera having a connection to a personal computer is known. The concept of controlling a camera with a computer is known. However, the prior art does describe a camera which works interactively with a computer. Also well known in the prior art are devices capable of editing graphic images. However, none provide for the integration of the camera and the graphics program in one all inclusive package.

For example, U.S. Pat. No. 5,138,459 issued on Aug. 11, 1992, to Roberts et al., describes an electronic still camera which converts analog composite video format to PC readable digital format and which also provides additional video inputs and outputs for capturing video images, monitoring video images on monitors and displays, and transmitting either compressed or unprocessed digital image data through a variety of output I/O channels in various formats. However this device does not allow still pictures to be saved in an analog/film format and is only capable of transferring the digital data to the PC.

U.S. Pat. No. 5,389,984 issued on Feb. 14, 1995, to Lovenheim reveals a system for recording identical electronic and photographic images. This system is connected to a computer for the purpose of sending a signal to the photographic camera to take a picture at a predetermined time before sending a signal to the video camera to take a picture. This device is controlled by the computer and does not have the ability to control the computer or to pass information to the computer.

Pure digital cameras are also well known. U.S. Pat. No. 5,249,053 issued on Sep. 28, 1993, to Jain reveals a film less digital camera with selective image compression. U.S. Pat. No. 5,150,215 issued on Sep. 22, 1992, to Shi is a dual film and still video camera for taking pictures in film and still video either simultaneously or individually, and which is capable of recording the CCD image through some magnetic means. Though this camera does take film pictures as well as CCD, it does not have its own image editing internal to the camera and is incapable of connection to a computer.

Scanners and feeders are also well known. U.S. Pat. No. 5,191,442 issued on Mar. 2, 1993, to Bar-Lev et al. reveals a scanner which uses a vacuum system to hold a document in place against a perforated scanning surface during registration and scanning. This device is not portable and has been designed primarily to scan portions of large documents. U.S. Pat. No. 5,253,062 issued Oct. 12, 1993, to Takeshi Ohta relates to an apparatus for transferring an image to and displaying the image on an NTSC, HDTV, or similar video monitor. This device does not allow for the editing of the video image.

U.S. Pat. No. 5,258,843 issued on Nov. 2, 1993, to Truong shows a video system which can overlay a primary image over a secondary image. This system does not have full editing functions.

U.S. Pat. No. 5,293,497 issued on Mar. 8, 1994, to Free discloses a system of transmitting data from a secondary computer to a receiving computer. The method disclosed includes a way of loading the communications program onto the receiving computer if it is not already present. This is all this program does; it does not choose the data to be transmitted as in this invention.

U.S. Pat. No. 5,387,986 issued on Feb. 7, 1995, to Gerhart shows an integrated edit board and document scanner which allows the original document and the newly edited section of the document to be easily correlated, because the document does not have to move. The present invention, having the full document in memory, does not rely on the placement of the document.

U.S. Pat. No 5,331,380 issued on Jul. 19, 1994, to Nasset shows a portable hand held photo copy reproduction holding device which uses a plastic sheet over the back board in order to create a static electric energy field that holds the subject matter to be photocopied in place. The sheet must be moved in order to place the document and might reflect light, thereby falsely shading the document. The present invention charges the copy board itself, thereby obviating the need for the plastic sheet and eradicates the said problems.

Today's high paced computer age has created a need for an integrated CCD and film camera which is integrated with its own editor and communications tool. Such a tool would allow pictures to be taken on sight, and, with the help of any computer or laptop, to be edited and then transmitted to the desired location. Such a need has not yet been filled.

None of the above inventions and patents, taken either singly or in combination, is seen to describe the instant invention as claimed.

SUMMARY OF THE INVENTION

The present invention overcomes the prior art by novelly combining prior art in order to create a camera which is capable of both CCD and film photography, and which is integrated with its own editor, paper holder, and communications tool, all of which are compact.

The present invention is a camera which has the ability to take pictures in digital or film format. It has the capability of sending these digital pictures over any phone to a portable computer. All of its programs are resident on EPROM inside the camera. These programs are capable of loading themselves onto any computer via the serial, parallel, or modem port with just a push of a button. Included in this EPROM is an image editor which has multiple editing modes and can print images on a local printer. Also, these digital photographs may be saved on a magnetic storage device, or any other format wherein digital data can be stored.

Additionally, this camera comes with a stand attachment which allows the camera to be used as a form scanner. This will allow forms to be digitally photographed, filled in on the screen, and then printed out on either the original form or recreated on blank paper.

It is a further object of this invention to provide a stand which holds the document to be photographed with out clips, this being done via either air suction or an electrostatic charge.

Accordingly, it is a principal object of the invention to wed existing computer and photographic technology to create a multi-functional portable camera.

It is an object of the invention to provide improved elements and arrangements thereof in an apparatus for the purposes described which is small, light weight, dependable and fully effective in accomplishing its intended purposes.

BRIEF DESCRIPTION OF THE DRAWINGS

FIG. 7 is a block wiring diagram of the invention.

Similar reference characters denote corresponding features consistently throughout the attached drawings.

DETAILED DESCRIPTION OF THE PREFERRED EMBODIMENTS

The present invention overcomes the prior art through the integration of past inventions in order to create a camera which is capable of both CCD and film photography which is integrated with its own editor and communications tool and which is compact.

Figure 1:
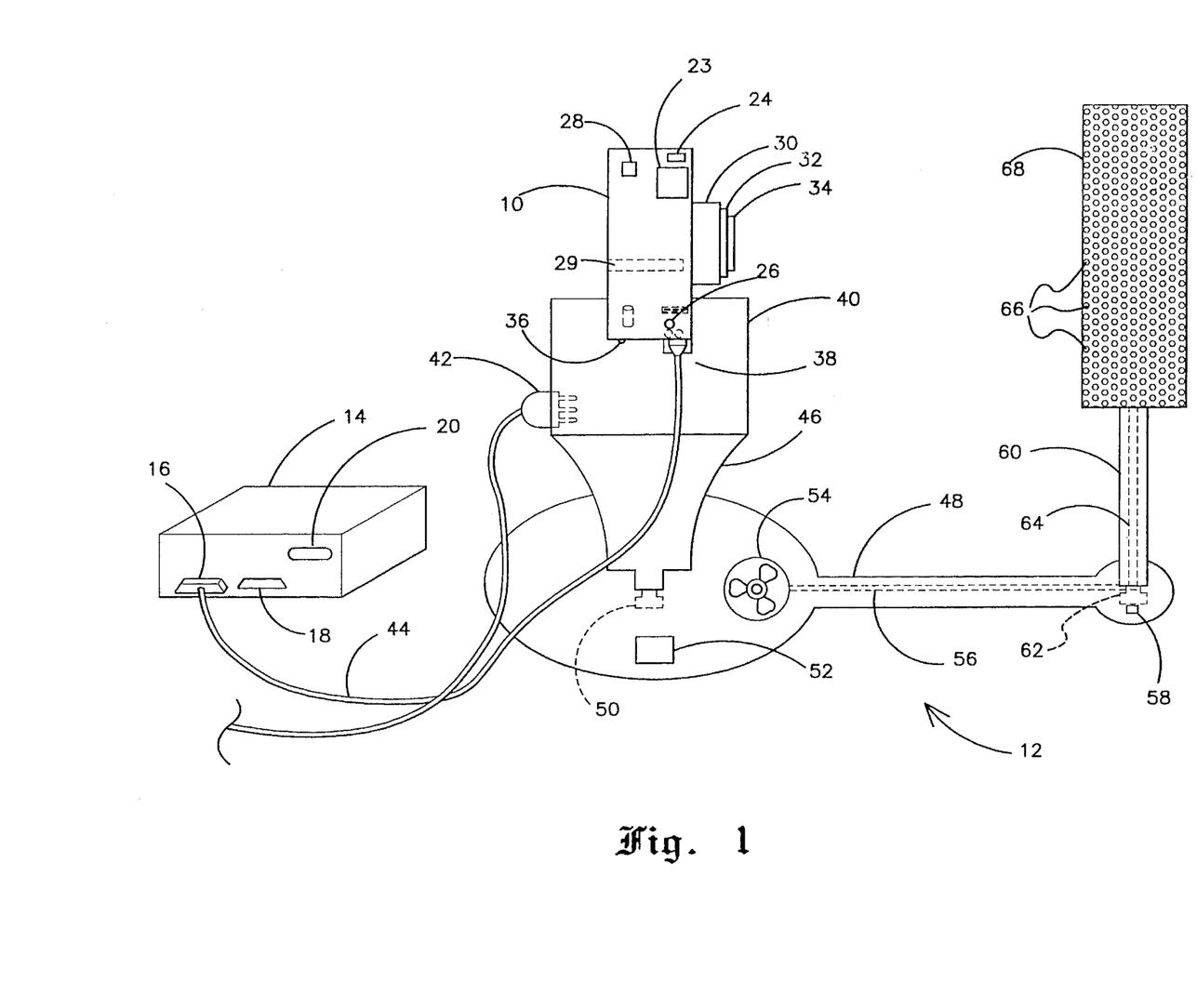
FIG. 1 is a modified, somewhat diagrammatic, partly perspective side elevational view of the invention, showing the camera with the stand fully assembled, and a computer to which the camera is attached.

FIG. 1 shows a camera 10 positioned on its right side and locked into a fully assembled stand 12, and a back of a computer 14 with a view of a RS-232 nine pin port 16, a RS-232 fourteen pin port 18, and a Lpt port 20. A camera cable 44 is shown connected to port 16 in FIG. 1. On the top of the camera 10 is a flash 22. To its left is a mode switch 24 which allows the camera to be set for either CCD, film or both. On the top right of the camera 10 is a shutter/photo switch 26, and a film counter 28. A PCMCIA slot 29 is seen, located into the rear of the camera 10. A camera lens 30 is located on the front of the camera 10. Around the lens is a shutter speed dial 32 and a focus dial 34. On the right side of the camera 10, one of the power contacts 36 and a RS-232 port 38 can be seen.

The camera 10 is locked into the stand 12. The piece of the stand which the camera is locked into is a powerpack 40. From this view only a power plug with cable can be seen. The other cable which is visible is a RS-232 or LPT cable 44 which runs from the computer to the camera. Below and attached to the power pack 40 is removable camera leg 46. This leg 46 is attached to a base 48. The locking piece 50 of removable leg 46 can be seen going into the base 48. On base 48 is a release button 52 for removable leg 46, a fan 54, a connecting air tube 56, and a release button 58 for a copy board leg 60. Leg 60 locks into the base via its locking piece 62. The suction created by the fan 54 travels through the connecting air tube 56 and when leg 60 locks into base 48, a sealed opening to the air tube 64, which goes through leg 60, is created. Through the use of these air tubes 56 and 64, the holes 66 in a copy board 68 are made to create a suction which holds the document to the copy board 68.

Figure 2:
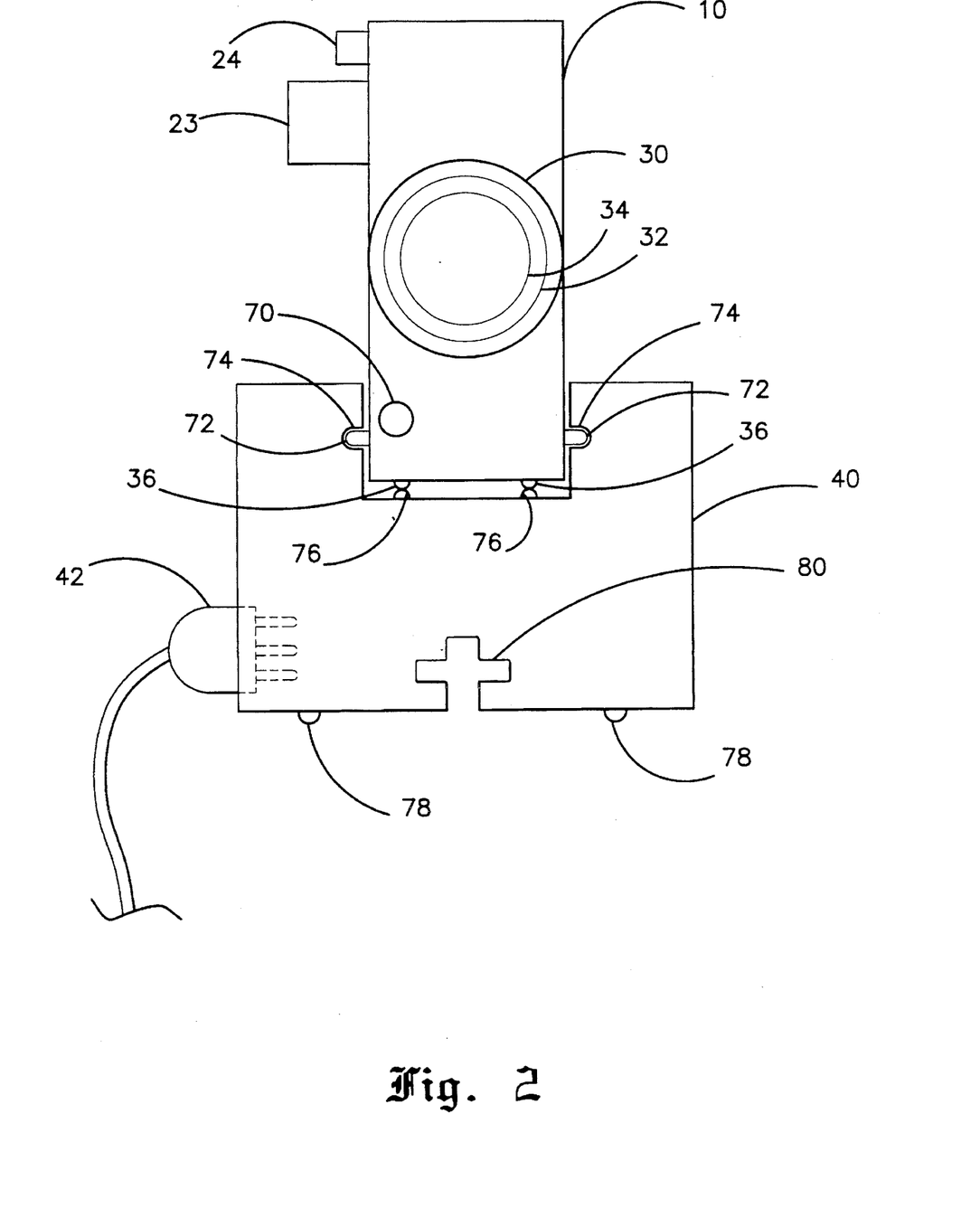
FIG. 2 is a front elevational view of the camera connected to the power pack with the power pack plugged in, drawn to an enlarged scale.

FIG. 2. shows the camera 10 locked into the power pack 40 section of the stand 12. On the camera can be seen the lens 30, and around the lens 30 is the shutter speed dial 32 and the focus dial 34. Next to the lens 30, on the front of the camera 10, is an ASA dial 70. On the top of the camera 10 is the mode switch 24 and the flash 23. On the top and on the bottom of the camera are slide projections 72, which slip into depressions 74 in the power pack 40. On the right side of the camera 10, both power contacts 36 touch the top power contacts 76, located on the power L5 pack 40. On the bottom of the power pack 40, two more power contacts 78 and a T cut away 80 can be seen. These contacts 78 allows the power pack 40 to lock into leg 46. Additionally, on the left side of the power pack, there is a power plug with cable 42.

Figure 3:
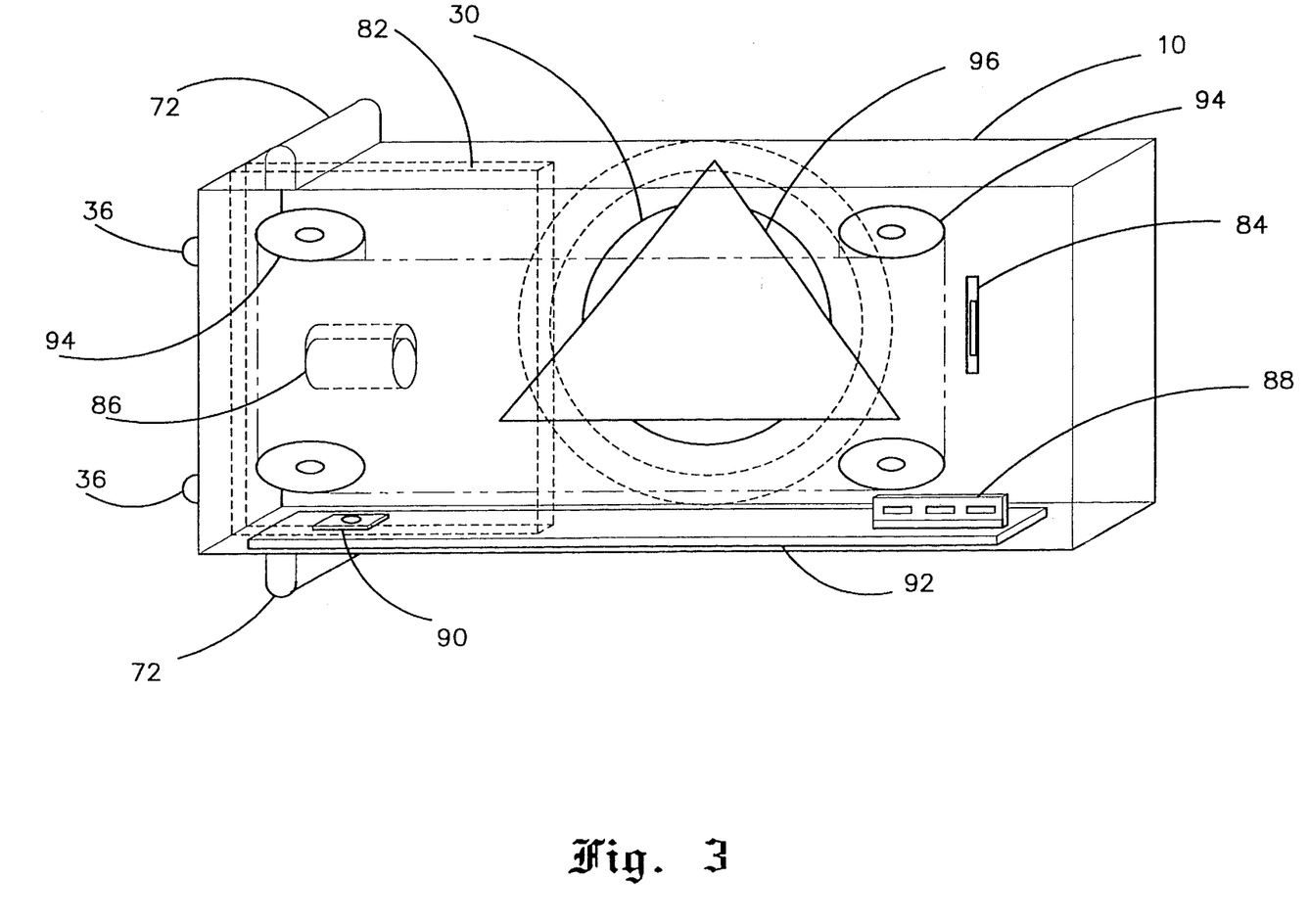
FIG. 3 is a front perspective view of the internals of the camera, drawn to an enlarged scale.

FIG. 3. illustrates the internals of the camera 10. The side slot for the 3.5 inch floppy 82 is shown on the left. A PCMCIA slot connector 84 is shown on the right. Four double A rechargeable batteries 86, and an EPROM 90 which holds the graphics program can be seen on the left. On the right a 1 meg single in-line memory module (SIMM) 88 which can be step upgraded to a 32 meg SIM is shown. Spanning the bottom of the camera is an integrated circuit board 92 which controls the CCD part of the camera and which, when the upload button is pressed, uploads the graphics and communications program through one of the i/o ports. Additionally, a 35 mm film holder 94, 94, and CCD/film plates 96 can be seen in front of the lens 30. On the outside of the camera 10 are the power contacts 36 and the slide projections 72.

Figure 4:
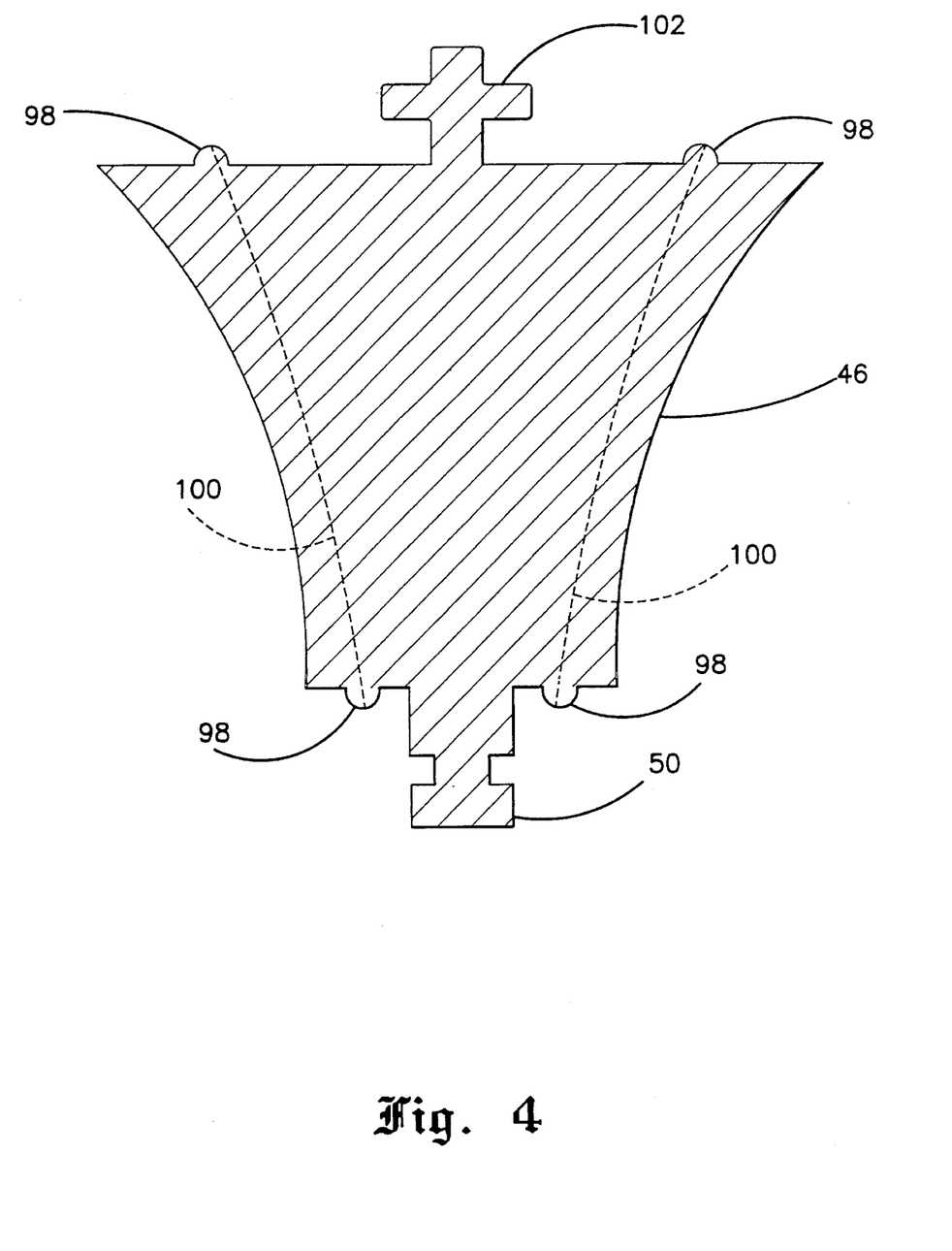
FIG. 4 is an enlarged scale, cross sectional view of a removable support leg of the invention.

FIG. 4. shows the removable camera leg 46. At the top and at the bottom of removable leg 46 are power contacts 98. Wires 100 can be seen which connect the top and bottom power contacts. On the top of removable leg 46 is the T extrusion 102 which goes into the T cut away 80 at the bottom of the power pack 40, thereby locking the two together. On the bottom of removable leg 46 is the locking piece 50 which secures the leg 46 to either base 48 or a second embodiment, removable base 104.

Figure 5:
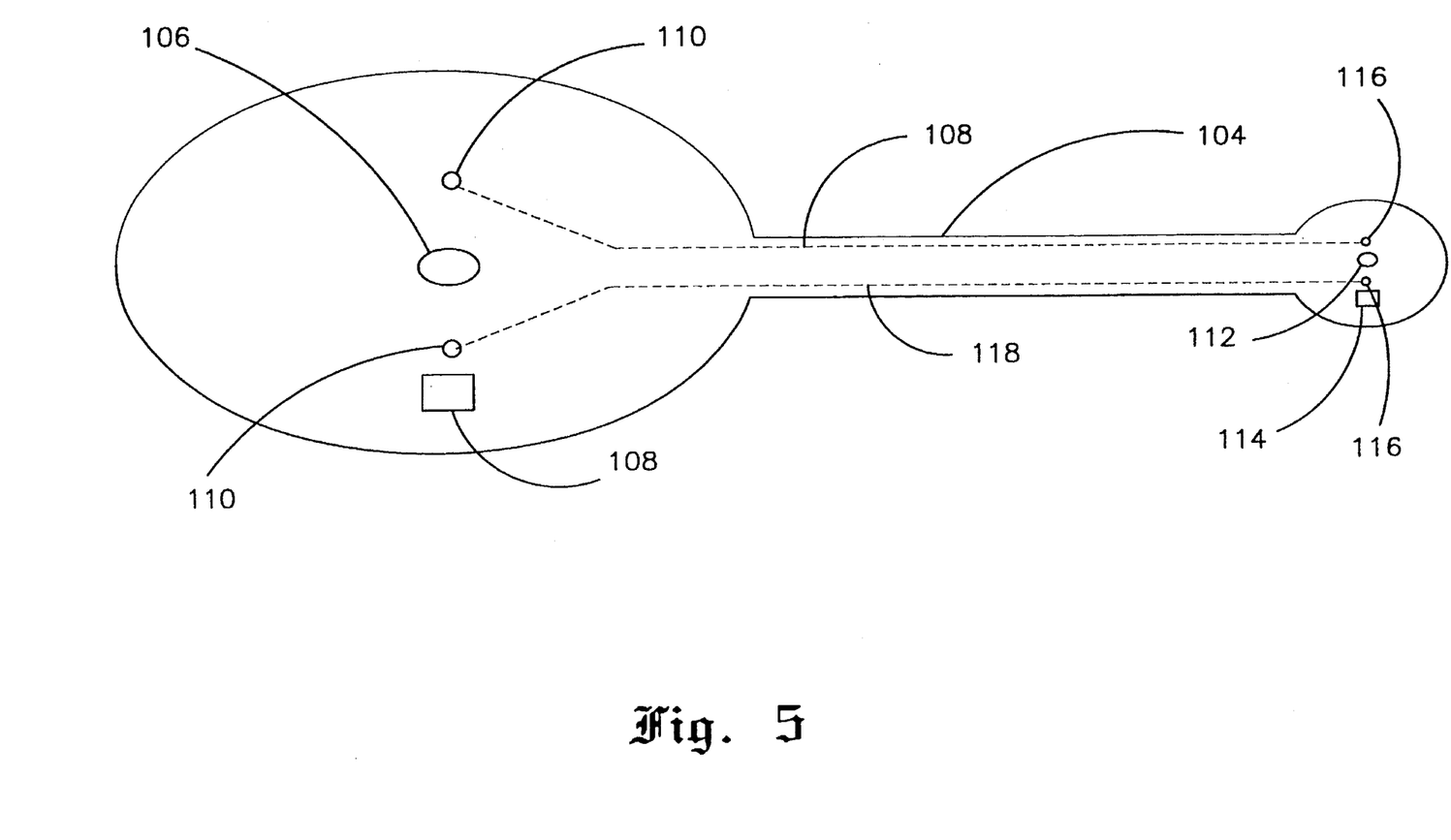
FIG. 5 is a diagrammatic perspective view of a second embodiment of the base of the invention.

FIG. 5. shows the second embodiment base 104. A hole 106 for the snap connection and a release button 108, and electrical contacts 110, all of which connect to removable leg 46 can be seen on the left. On the right, a hole 112 for the snap L5 connection and release button 114, and electrical contacts 116 which connect to leg 120 can be seen. Connecting the electrical contacts on either side 110 and 116 are wires 118 running through base 104.

Figure 6:
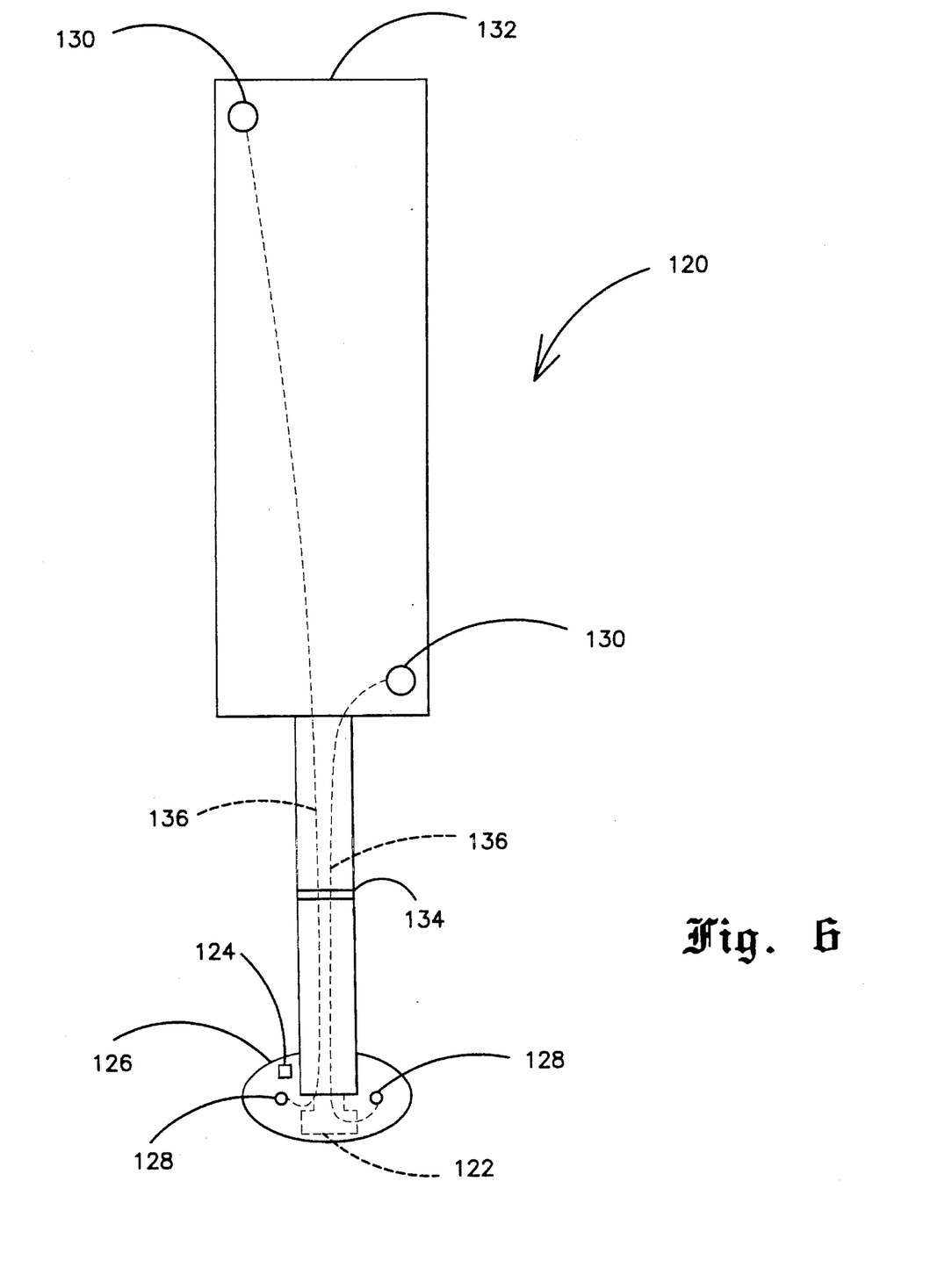
FIG. 6 is an side elevational view, partly in perspective, of a second embodiment of the removable copyboard and its support of the invention.

FIG. 6 discloses leg 120. At the bottom is a bottom snap connection 122, a snap release button 124, and a round plate at the bottom 126 with electrical contacts 128. At the top is the copy board 132. On the top left and bottom right of the copy board 132 are electrical contacts 130. The latter contacts 130 deliver a static electric charge to the copy board 132. It is this charge which holds the paper (not shown). A rubber washer 134 is present in the neck of leg 120. This electrically isolates the copy board 132 making the charge relatively constant. Also visible are the electrical wires 136 which connect the contacts 130 and 128.

FIG. 7. is a block diagram of how the camera 10 functions. Light enters the camera via the lens 30. The lens 30 is controlled by a lens controller 138, which directs a lens motor 140. The lens controller 138 is in turn controlled by a main film controller 142. The main film controller 142 also controls a film motor and drive 144, a shutter and its controller 146, and a mirror 158 and its controller 148. The mirror is used to direct the light through to the shutter 146 or up to a charged coupled device (CCD) sensor processor and drive 150. The CCD sensor and drive 150 are controlled directly by a central processing unit (CPU) 152 through the use of the CCD command set 154.

BUS and all other types of active volatile memory 156 will be located centrally in the form of a single SIM which can easily be upgraded to 32 meg ram and wherein a BIOS 190 is auto-sensing. Depending on how the mode switch 24 is set, the mirror 158 will either be up or down or will be up and then flip down if set on dual mode. The mirror controller 148 will be told how the mode switch 24 is set based on the signals coming out of the switch controller 160 which sends its commands directly to the CPU 152. Once a digital image has been stored in memory 156, that image can be directed to the floppy drive 162 via the input/output controller (I/O) 164, or it can be temporarily left in memory 156 while it is transmitted to a computer 14.

The way an individual can tell the camera 10 to transmit an image is by physically connecting it to a computer 14. This is done via a parallel 165 or serial 166 port or through a telephone by using the modem port 168. After the appropriate cable 44 has been joined to the computer 14 and the camera 10 the individual will press the upload button 170. The only switch not connected to the switch controller 160 is a on/off switch 192. The on/off switch 192 is located on the hot side of the power 86. The upload controller 172 will auto sense which port is being used and make a connection with the remote computer 14 (see FIG. 1). Once the connection is made the upload controller 172 will auto sense to see if command sets 1 and 2, the upload program and the graphics program are at that time either running on the remote computer 14 or are present on the remote computer's 14 hard drive. If the programs are present then they will be used by the upload controller 172 to upload the graphics image. If the programs are not present then the upload controller 172 will first upload the programs to the remote computer 14 and then will upload the graphics image. The programs are stored in the camera in a non-volatile storage device 174 and the status of the upload is shown on a liquid crystal display (LCD) 176.

It is to be understood that the present invention is not limited to the embodiments described above, but encompasses any and all embodiments within the scope of the following claims.

I claim:

1. A multi-functional camera comprising:

digital imaging means for converting a light image into a digital signal;

means for fixing the light image on film;

a micro-processor and a volatile storage device, there further being a BUS incorporated within said volatile storage device, said micro-processor communicating with both said digital imaging means and said means for fixing the light image on film via said BUS;

a memory storage device communicating with said microprocessor, there further being a first instruction set and a second instruction set, said memory storage device storing said first instruction set and said second instruction set for transmitting;

said volatile storage device communicating with said micro-processor and said memory storage device, said volatile storage device storing the digital signal;

an input and output means communicating with said microprocessor and transmitting said first instruction set and said second instruction set to a remote digital processing means;

said micro-processor controlling said digital imaging means, said means for fixing the light image on film, said volatile storage device, said memory storage device and said instruction sets therein.

2. The multi-function camera according to claim 1, further comprising a stand for said camera, a power pack incorporated into said stand, and a copy board affixed to said stand.

3. The multi-function camera according to claim 2, further comprising first means for removably attaching said camera to said stand, and second means for removably affixing said copy board to said stand.

4. The multi-function camera according to claim 2, wherein said copy board further includes means defining a patterned array of perforations therethrough, and a connection to a source of vacuum which, when applied to said perforations, holds copy to said copy board.

5. The multi-function camera according to claim 2, wherein said copy board further includes means for generating an electrostatic charge thereacross for holding copy to said copy board.

6. A multi-functional camera comprising:

digital imaging means for converting a light image into a digital signal;

a micro-processor and a volatile storage device, there further being a BUS incorporated within said volatile storage device, said micro-processor communicating with said digital imaging means via said BUS;

a memory storage device communicating with said microprocessor, there further being a first instruction set and a second instruction set, said memory storage device storing said first instruction set and said second instruction set for transmitting;

said volatile storage device communicating with said micro-processor and said memory storage device, said volatile storage device storing the digital signal;

an input and output means communicating with said microprocessor and transmitting said first instruction set and said second instruction set to a remote digital processing means;

said micro-processor controlling said digital imaging means, said volatile storage device, said memory storage device and said instruction sets therein.

7. The multi-function camera according to claim 6, further comprising a stand for said camera, a power pack incorporated into said stand, and a copy board affixed to said stand.

8. The multi-function camera according to claim 7, further comprising first means for removably attaching said camera to said stand, and second means for removably affixing said copy board to said stand.

9. The multi-function camera according to claim 7, wherein said copy board further includes means defining a patterned array of perforations therethrough, and a connection to a source of vacuum which, when applied to said perforations, holds copy to said copy board.

10. The multi-function camera according to claim 7, wherein said copy board further includes means for generating an electrostatic charge thereacross for holding copy to said copy board.

\* \* \* \* \*